United States Patent
Hsieh et al.

(10) Patent No.: US 7,092,162 B1
(45) Date of Patent: Aug. 15, 2006

(54) BANDWIDTH ENHANCEMENT DEVICE

(76) Inventors: Yung-Chieh Hsieh, 3176 Salem Dr., San Jose, CA (US) 95127; Chiayu Ai, 37057 Chestnut St., Newark, CA (US) 94560

( * ) Notice: Subject to any disclaimer, the term of this patent is extended or adjusted under 35 U.S.C. 154(b) by 0 days.

(21) Appl. No.: 11/200,932

(22) Filed: Aug. 9, 2005

Related U.S. Application Data

(63) Continuation-in-part of application No. 10/700,640, filed on Nov. 3, 2003, now abandoned.

(60) Provisional application No. 60/423,515, filed on Nov. 2, 2002.

(51) Int. Cl.
 *B02B 5/28* (2006.01)
(52) U.S. Cl. ............ 359/590; 359/577; 359/583; 359/580; 356/519; 385/31; 385/73
(58) Field of Classification Search ........ 359/577, 359/580, 583, 590; 356/519; 385/73, 31
See application file for complete search history.

(56) References Cited

U.S. PATENT DOCUMENTS

| | | |
|---|---|---|
| 6,215,592 B1 | 4/2001 | Pelekhaty |
| 6,275,322 B1 | 8/2001 | Tai |
| 6,334,924 B1 | 1/2002 | Fukushima |
| 6,341,186 B1 | 1/2002 | Singh et al. |
| 6,710,922 B1 | 3/2004 | Janssen |
| 2002/0113974 A1* | 8/2002 | Clark ............... 356/519 |
| 2003/0081908 A1* | 5/2003 | Gage et al. ............ 385/74 |

OTHER PUBLICATIONS

E.G. Churin, et al., "Passband flattening and broadening techniques for high spectral efficiency wavelength demultiplexers," Electronics Lett, vol. 35, No. 1, pp. 27-28, Jan. 7, 1999.
B. B. Dingel, et al., "Multifunction optical filter with a Michelson-Gires-Tournois interferometer for wavelength-division-multiplexed network system applications," Optics Letters, vol. 23, No. 14, pp. 1099-1101, Jul. 15, 1998.
B. B. Dingel, et al., "Properties of a novel noncasted type, easy-to-design, ripple-free optical bandpass filter," J. Lightwave Technology, vol. 17, No. 8, pp. 1461-1469, Aug. 1999.

* cited by examiner

*Primary Examiner*—Fayez G. Assaf
(74) *Attorney, Agent, or Firm*—Antonio R. Durando

(57) ABSTRACT

An optical cavity is combined with a MUX or a de-MUX device having substantially the same free-spectral range in order to enhance the bandwidth of the device. The optical cavity can be tuned to shift the frequencies of maximum insertion loss to match the center frequency of each channel. The reflectivities of the reflective surfaces of the cavity are judiciously selected to produce the insertion-loss spectrum needed to optimize the desired result. Multiple cavities can be used in series to refine the shape of the pass-band spectrum. A frequency window is used to fine tune the free-spectral range of the cavity and to shift the peaks of its insertion-loss spectrum to the desired frequencies. Inner and outer cavity surfaces are oriented to eliminate interference from secondary reflections.

17 Claims, 13 Drawing Sheets

Athermal spacer

BANDWIDTH ENHANCEMENT DEVICE

RELATED APPLICATIONS

This application is a CIP application of U.S. Ser. No. 10/700,640, filed Nov. 3, 2003, now abandoned which was based on U.S. Provisional Ser. No. 60/423,515, filed Nov. 2, 2002.

BACKGROUND OF THE INVENTION

1. Field of the Invention

The invention pertains to the general field of optical multiplexers and de-multiplexers and, in particular, to a device for improving the bandwidth and spectral uniformity of multiple-channel optical systems.

2. Description of the Prior Art

In dense wavelength division multiplexing (DWDM) optical communication, various frequencies ($1/\lambda$) of laser light are used as carrier signals (channels) and are coupled into the same optical fiber, which acts as a waveguide. Data signals are superimposed over the carrier signals and are transported in the waveguide. Thus, the information capacity is directly proportional to the number of channels in the fiber. Since the total usable wavelength range is limited (about a few tens of nanometers), as channel spacing decreases, more channels can fit into the same optical fiber and greater communication capacity is achieved.

Channel spacing is limited by the capability of the multiplexer (MUX) and the de-multiplexer (de-MUX). Currently, the standard channel spacing is 100 GHz (0.8 nm) and manufacturing costs increase dramatically to implement a channel spacing smaller than 100 GHz. Various methods are known in the art to multiplex and de-multiplex signals with different carrier frequencies (wavelengths). When the total number of channels is less than about 20, the technology based on thin-film filtering is preferred because of its wide bandwidth, its good thermal stability, and the facility with which channels may be added to the system. However, since the channels are de-multiplexed by cascading filters in series, the insertion losses are not uniform among the various channels. In addition, when the channel spacing is about 50 GHz or smaller, narrow-band filters based on thin-film technology add too much chromatic dispersion for some applications.

Therefore, when the number of channels is high (e.g., more than about 40), it has been preferable in the art to use optical devices that provide a more uniform loss throughout the channels and exhibit a smaller chromatic dispersion than thin-film technology. For example, devices based on array waveguide grating (AWG) and diffraction grating provide these advantages. However, such devices tend to produce a narrower bandwidth than thin-film technology, which severely limits their application. Therefore, a cost-effective method for increasing the bandwidth of multiplexing and de-multiplexing devices with uniform insertion loss throughout the channels and minimal chromatic dispersion would be very desirable.

For example, FIG. 1 illustrates the typical spectrum of a grating de-multiplexer. The insertion loss of the system is shown as a function of normalized frequency. As normally done in the art, the normalization factor is the free-spectral range of the spectrum (e.g., in a 100 GHz DWDM system, the normalization factor is 100 GHz). The spectrum 10 of each channel is characteristically dome shaped at the center frequency of each channel, which produces a very narrow bandwidth at half dB (about 0.23 units of normalized frequency). In a 100 GHz system, this corresponds to 23 GHz, which is too narrow for most applications. As one skilled in the art would readily understand, the so called bandwidth at "half dB" corresponds to the bandwidth within which the insertion loss of a device is less than approximately 10% from peak and is a measure of the insertion loss variation normally tolerated within a bandwidth in the art. Therefore, the general objective of the invention is to suppress transmission near the center frequency of each channel to produce a more uniform (flat) spectral response, such that as much as possible of the insertion-loss spectrum in each channel falls within the half dB range.

This objective could be achieved in straightforward manner by inserting a filter in each channel with an insertion loss that has maximum magnitude in the neighborhood of the center frequency of the channel. However, multiple filters would be required with significant cost increase to the system. The invention provides a single optical device with an insertion-loss spectrum characterized by periodical maxima (in magnitude) that can be selected to coincide with the pass-band center frequencies of the grating de-multiplexer. In addition, the shape of the insertion loss can be judiciously designed for a particular purpose, thereby providing a tool for attenuating the dome-shaped portion of the spectrum to increase the bandwidth of all channels in a system with a single optical device.

SUMMARY OF THE INVENTION

In its preferred embodiment, the invention lies in the idea of combining an optical cavity with a MUX or a de-MUX device having substantially the same free-spectral range in order to widen the bandwidth of the device. The optical cavity can be tuned to shift the frequencies of maximum insertion loss to match the frequencies of the pass-band channels in the device where spectral attenuation is desired, preferably the center frequency of each channel. According to one aspect of the invention, the reflectivities of the reflective surfaces of the cavity are judiciously selected to produce the insertion-loss spectrum from the cavity needed to optimize the desired result. Multiple cavities can be used in series to refine the shape of the pass-band spectrum.

According to another aspect of the invention, a frequency window is used to fine tune the free-spectral range of the cavity and to shift the peaks of its insertion-loss spectrum to the desired frequencies. Accordingly, the output of the optical cavity, either in transmission or reflection, can be used advantageously to attenuate the spectrum at the desired frequency. Therefore, the invention is suitable for insertion-loss spectrum suppression and correspondingly for bandwidth enhancement of the pass band of any device, in single—as well as multi-channel systems.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention provides a novel approach for increasing the acceptable spectral bandwidth of an optical device. The concept is particularly useful in multiplexing and de-multiplexing devices where a flat, wide-band response is desirable in each channel. The approach is based on the idea of combining such optical device with an optical cavity and exploiting the properties of cavities to produce a periodic spectrum with a free-spectral range, a spectrum shape, and pass- and stop-band center frequencies judiciously designed to flatten the pass-band spectrum of the optical device.

In the following description of optical trains (which in the context of this invention are defined as sets of one or more optical elements performing the required optical functions), the loss of light on residual reflections at interfaces, on absorption in materials, and on scattering is of little relevance to the subject matter of the invention; thus, a discussion of these residual losses is omitted. In practice, they can be dealt with in conventional manner by providing an adequate level of AR-coating on corresponding optical surfaces and by choosing appropriate materials that are translucent in the spectral ranges of interest. Similarly omitted is a discussion of the power ratio (or power splitting) between the various beams within the system, which in practice can be adjusted by an appropriate opto-mechanical design.

As used in the art, "free-spectrum range" refers to the ration c/(2l), where c is the speed of light and l is the optical length of a cavity. Accordingly, when two cavities have the same optical length, their free-spectrum range is matched and they produce spectra with the same period. Free-spectrum range also refers to the distance (measured in the normalized-frequency domain) between peaks in the spectrum of the output of a cavity.

Figure 2:
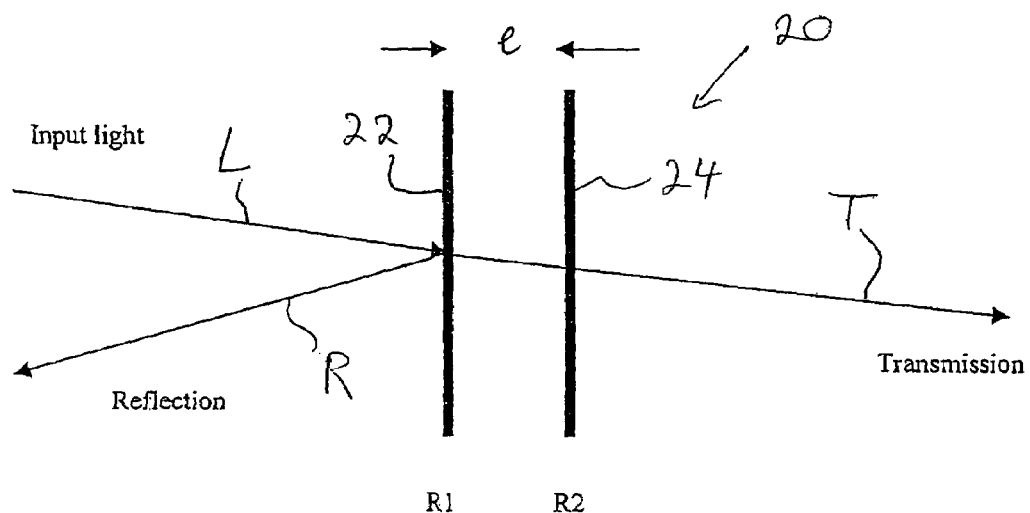
FIG. 2 is a schematic illustration of an optical cavity suitable for improving the channel bandwidth of a multi-channel system according to the invention.

Referring to the figures, wherein like parts are designated with like numerals and symbols, FIG. 2 illustrates schematically an optical cavity 20 consisting of two reflective surfaces 22 and 24 with reflectivity R1 and R2, respectively. As well understood in the art, the desired reflectivity of the surfaces 22,24 may be obtained in various equivalent ways, such as by coating either side of each surface. Such a structure is commonly referred to as an etalon. When a beam of light L impinges on the cavity 20, a portion of light R is reflected out of the cavity while another portion T is transmitted through the cavity. Because of multi-reflection interference in the cavity, both the reflected and the transmitted outputs have a periodic frequency spectrum and a shape that depends on the "Finesse" of the etalon, a quantity that can be calculated as a function of the surface reflectivities. For example, for the case when R1=R2=R, the relationship between the reflectivity of the cavity and the width of the spectrum of the periodic wave produced on transmission by the cavity may be quantified by the following general equation:

$$\pi \sqrt{R}/(1-R) = FSR/FWHM = \text{Finesse}$$

where R=R1=R2 is the reflectivity of each reflective surface in the cavity, FSR is the cavity's free-spectrum range, and FWHM is the full width of the transmission normalized-frequency spectrum curve at half maximum.

By selecting a cavity length such that its free-spectrum range is equal to that produced by a particular multi-channel system, the cavity displays a periodic spectral response with the same period of the spectrum of the light produced by the system. Therefore, in view of the foregoing, this property of cavities can be advantageously used to selectively reflect and transmit predetermined wavebands. In addition, by appropriately manipulating the reflectivities R1 and R2 (according to principles clearly understood in the art, as illustrated in the example above), the insertion loss spectrum may be selectively modified in the output streams of the cavity and used to flatten the spectrum of the multi-channel device.

Figure 3:
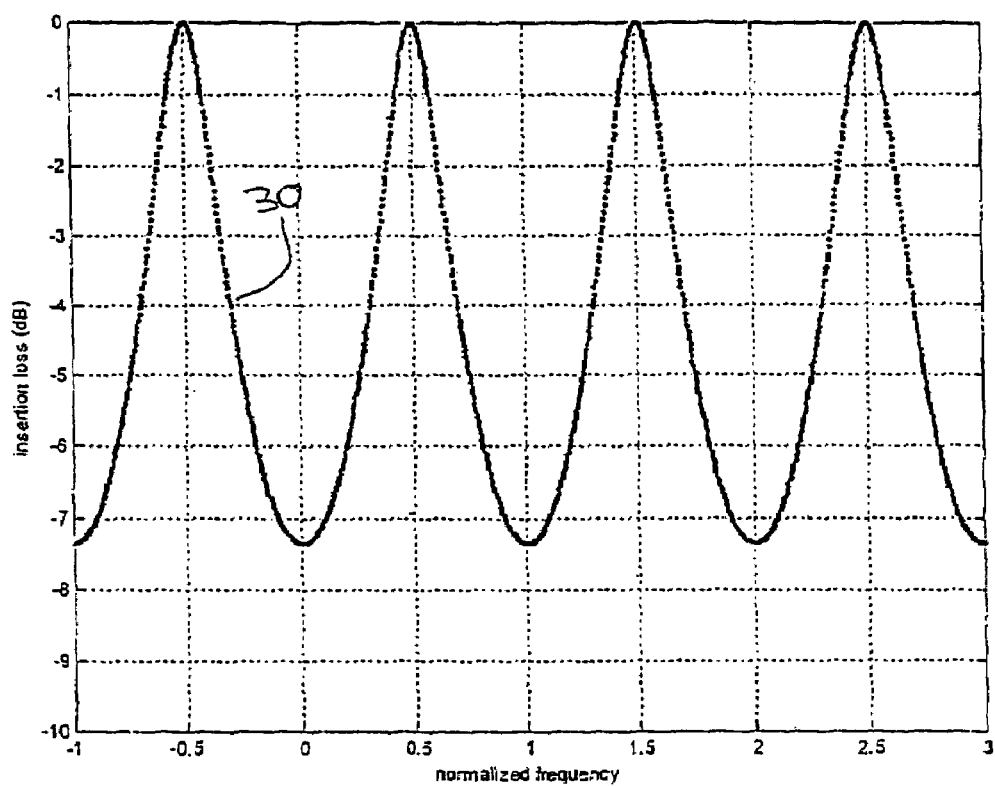
FIG. 3 illustrates the spectral response of the transmission output of a cavity such as illustrated in FIG. 2 with an FSR equal to the spectrum of FIG. 1.

For example, FIG. 3 illustrates the spectrum 30 of the transmission beam T in a cavity 20 exposed to a white-light beam L where both reflective surfaces 22,24 have 40% reflectivity (i.e., R1=R2=40%). The spectrum shows that most of the light is transmitted halfway between integer values of normalized frequencies, but significant insertion losses are present in the neighborhood of such integer normalized-frequency values (as high as −7.4 dB at the normalized center wavelengths of each pass band). The free-spectral range (FSR) of the transmission beam out of the cavity 20 is the same as the channel spacing of the DWDM system of FIG. 1. Therefore, this property can be exploited to flatten the dome-shaped spectrum 10 of the multi-channel system simply by inserting the cavity 20 in the path of the multi-channel beam prior to de-multiplexing.

Figure 1:
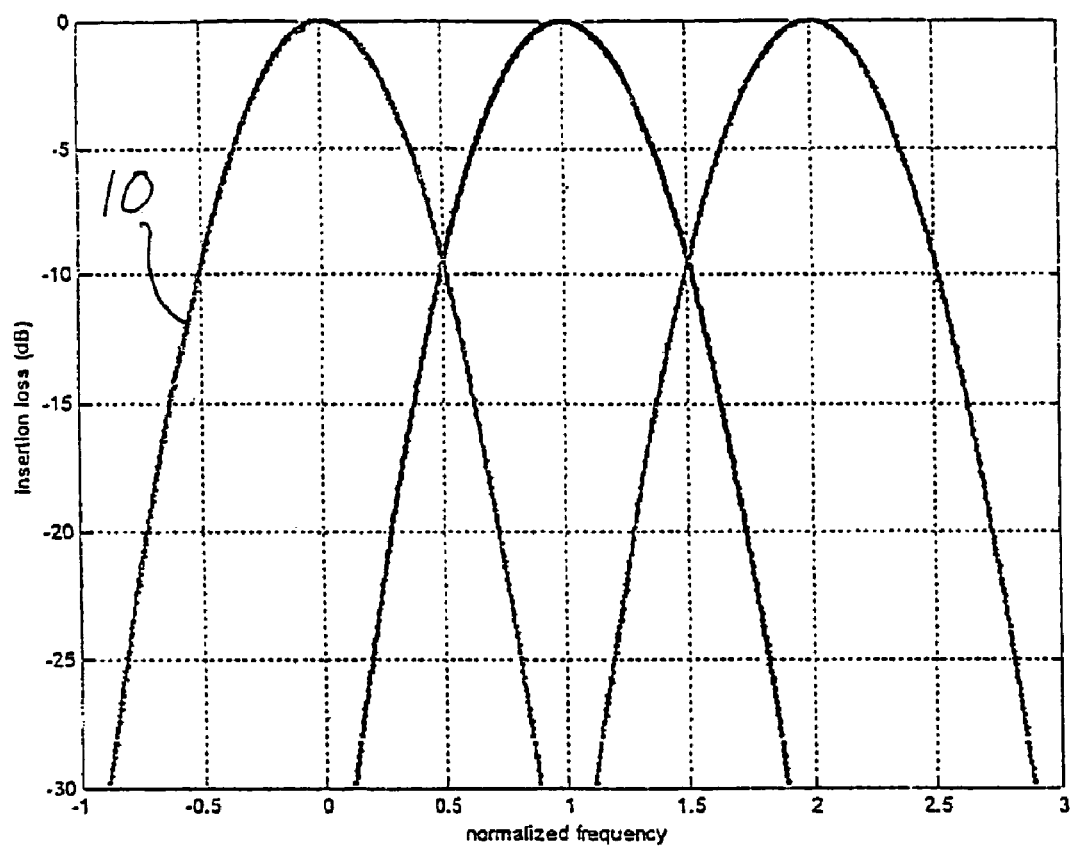
FIG. 1 illustrates the spectral response of three consecutive channels of a conventional DWDM system de-multiplexing white light, as measured by insertion loss as a function of normalized frequency.
Figure 4:
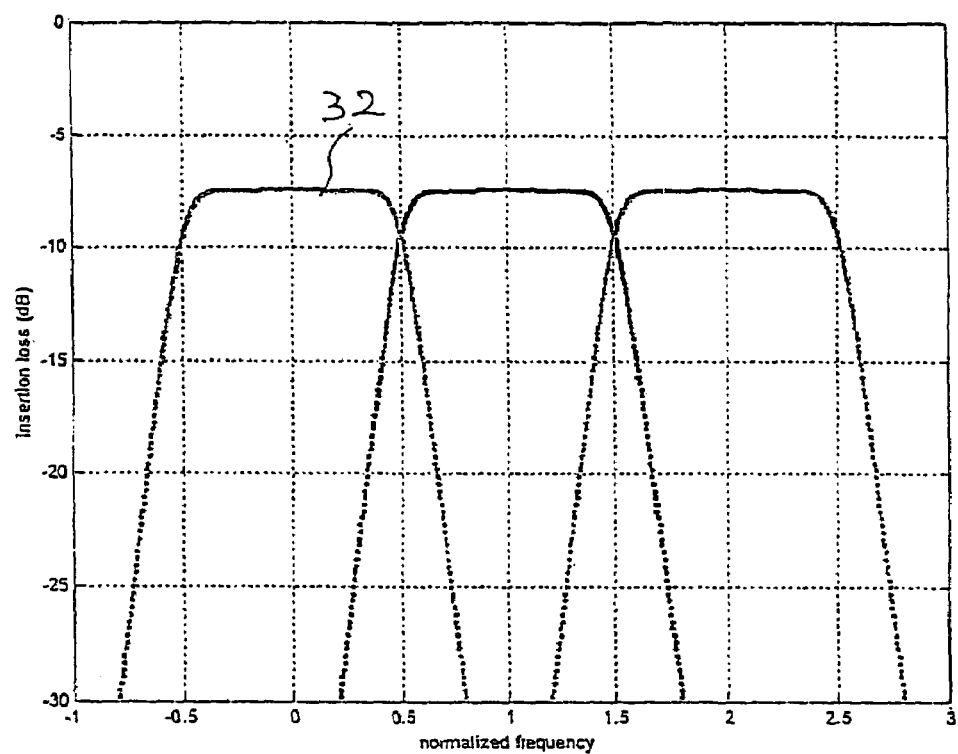
FIG. 4 shows the spectral response obtained by combining the transmission output of the cavity with the spectral response of FIG. 3 with the de-MUX device that has the spectral characteristics shown in FIG. 1.

As illustrated in FIG. 4, the combination of the spectra of FIGS. 1 and 3 produces a spectrum 32 that is essentially the summation of the two curves 10 and 30 when the maximum insertion loss (in magnitude) is aligned with peaks of the DWDM system's spectrum. The combined spectrum 32 has a peak insertion loss of magnitude about 7.3 and a half-dB bandwidth of 0.86, showing a significant increase from the 0.23 value of the multi-channel device (FIG. 1). Accordingly, the spectrum 32 has considerably flatter tops. This benefit of the invention is counterbalanced by the higher insertion loss of the system (about magnitude 7.3 dB across the bandwidth), but this shortcoming can be easily and cheaply overcome simply by providing more energy to the system.

Figure 5:
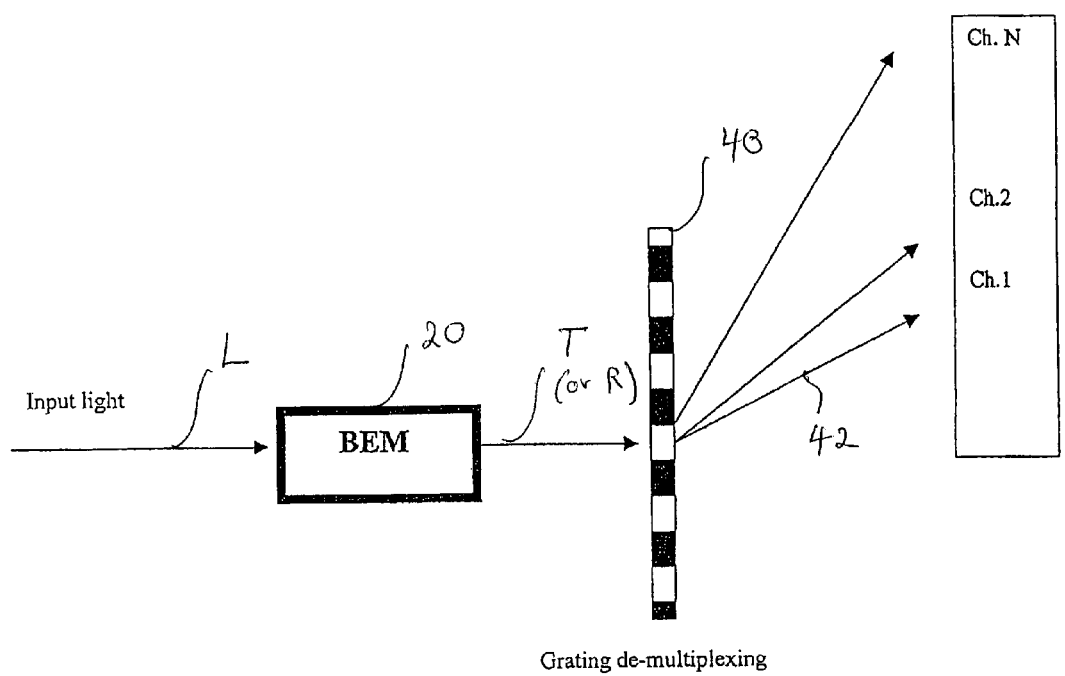
FIG. 5 is a schematic representation of the invention wherein a conventional grating de-MUX device is combined with an optical cavity having an optical path length producing a free=spectral range that substantially matches the free-spectrum range of the device.

Thus, the example of FIG. 4 demonstrates that a cavity can be used advantageously as a bandwidth enhancement module in MUX and de-MUX systems. The bandwidth of the dome-shaped peak of each channel can be improved by inserting a cavity with a periodic spectrum exhibiting the same FSR as the system and a maximum insertion loss (in absolute value) near the center of each channel pass band. The reflectivities of the cavity surfaces 22,24 need to be judiciously selected to provide the desired shape in the spectral response of the cavity. FIG. 5 illustrates a cavity 20 combined with a grating-type de-MUX device 40 according to the invention to produce a multi-channel output with improved bandwidth in each channel 42. It is noted that the cavity is shown in block form to illustrate its use both in reflection and transmission in combination with a MUX or de-MUX device.

Figure 6:
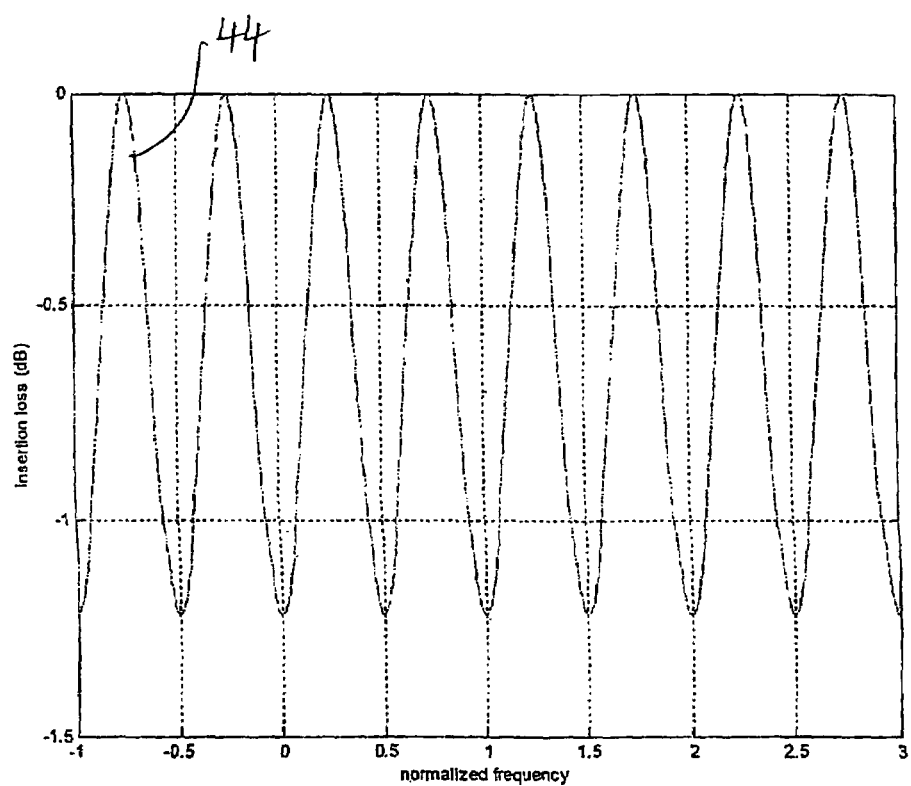
FIG. 6 illustrates the spectral response of the transmission output of a cavity such as illustrated in FIG. 2 with an FSR equal to half that of the spectrum of FIG. 1.
Figure 7:
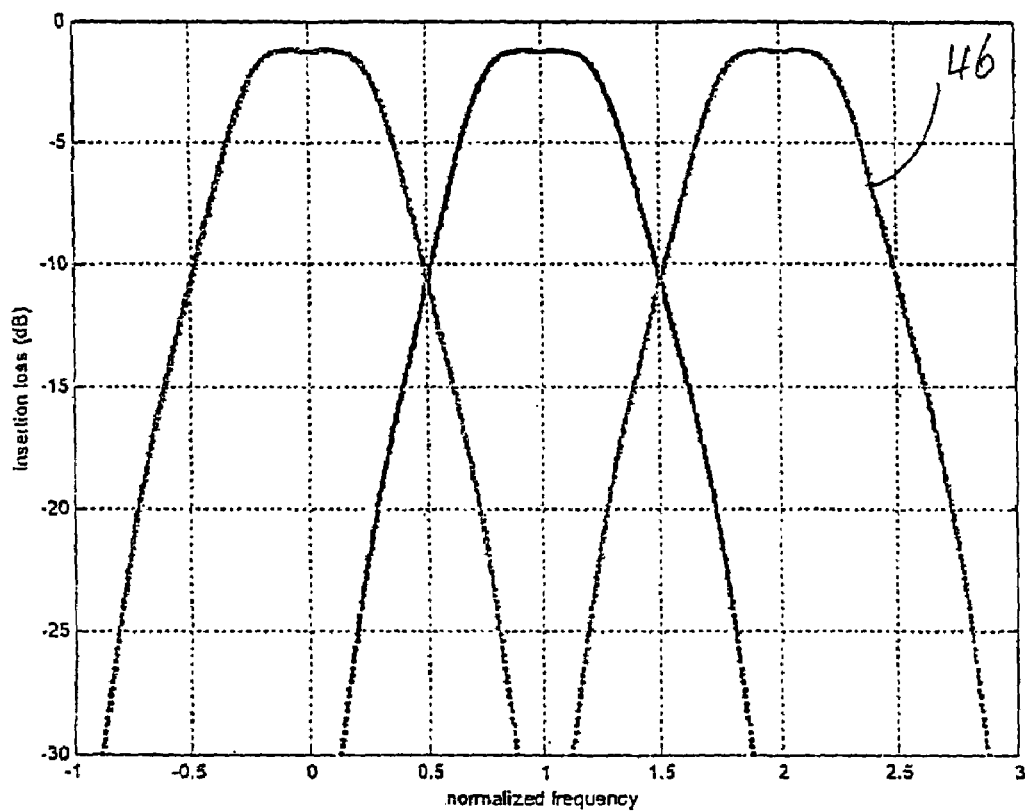
FIG. 7 shows the spectral response obtained by combining the transmitted beam of a cavity having the characteristics shown in FIG. 6 when de-MUX device with the characteristics of FIG. 1.

FIG. 6 illustrates the transmission spectrum 44 of another cavity according to the invention with a free-spectrum range equal to half that of FIG. 3 and both reflective surfaces 22,24 with 7% reflectivity. FIG. 7 shows the corresponding spectral response 46 when such a cavity is inserted in the path of the multi-channel system of FIG. 1. In this case, the combined spectrum produces a half-dB bandwidth of about 0.41 and a peak insertion loss of about 1.2 dB in within the pass band of each channel. For a 100 GHz system, this corresponds to a bandwidth of about 41 GHz, which is wide enough for most applications. Compared to the results of FIG. 4, FIG. 7 shows a narrower bandwidth but with significantly less increase in insertion loss.

Figure 8:
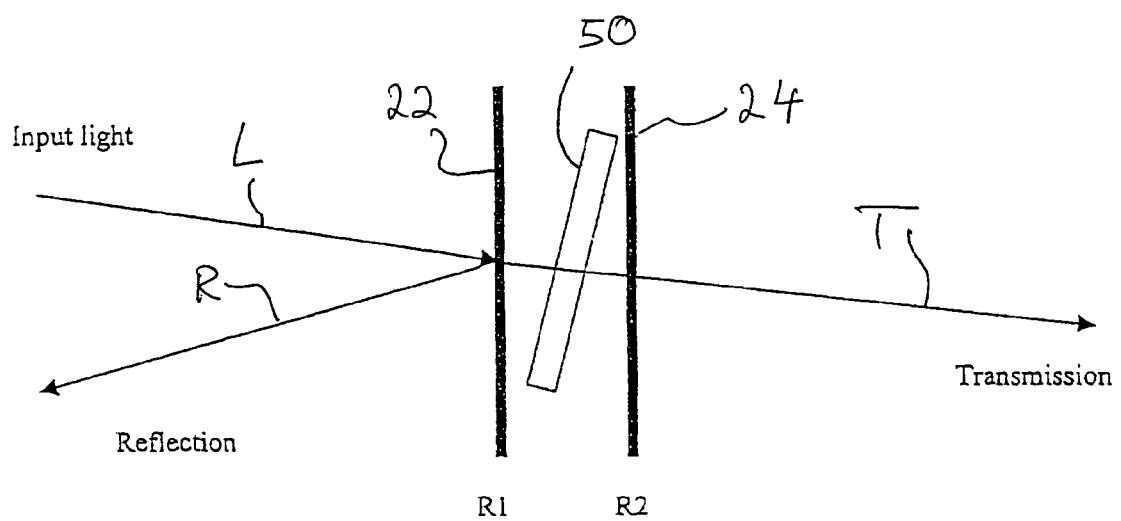
FIG. 8 illustrates in schematic view a cavity according to the invention wherein a frequency window is used to provide the ability to fine tune the optical path length of the cavity.

In practice, it is difficult to construct a conventional cavity with a length l such that its free-spectrum range matches exactly that of the multi-channel system with which it is to be combined. In addition, the optical length of the cavity also determines the exact frequency of maximum insertion loss, which needs to adjusted to match the peak of each channel's center frequency. Therefore, according to another aspect of the invention illustrated in FIG. 8, a frequency window 50 is inserted in the cavity 20 of the invention to provide the ability to fine tune the optical path length of the cavity. In its simplest form, a frequency window consists essentially of a parallel glass plate mounted on a rotating fixture between the two cavity surfaces 22,24 to precisely control the optical path length of the cavity. The glass plate refracts the incident optical signal to increase the length of its optical path as a function of the angle of incidence. The device can easily achieve a precision in the order of nanometers and is particularly suitable to fine tune the cavity length of a resonator. The use of such a frequency window is disclosed in co-owned U.S. Ser. No. 10/287,340, entitled Optical Path Length Tuner, hereby incorporated by reference.

Thus, a simple and cost-effective method has been disclosed to widen, in general, the pass-band width of a device and, in particular, to improve the bandwidth of each channel in a multi-channel system. The approach can be used to flatten the spectrum of any single- or multi-channel beam by properly adjusting the optical path length of the cavity and the reflectivities R1 and R2 of the cavity's reflective surfaces to fit specific requirements. As those skilled in the art would readily understand, different combinations of R1 and R2 provide different insertion-loss spectra and, accordingly, different degrees of bandwidth improvement. Also, if a wider pass bandwidth is desired, additional cavities may be used in series.

Figure 10:
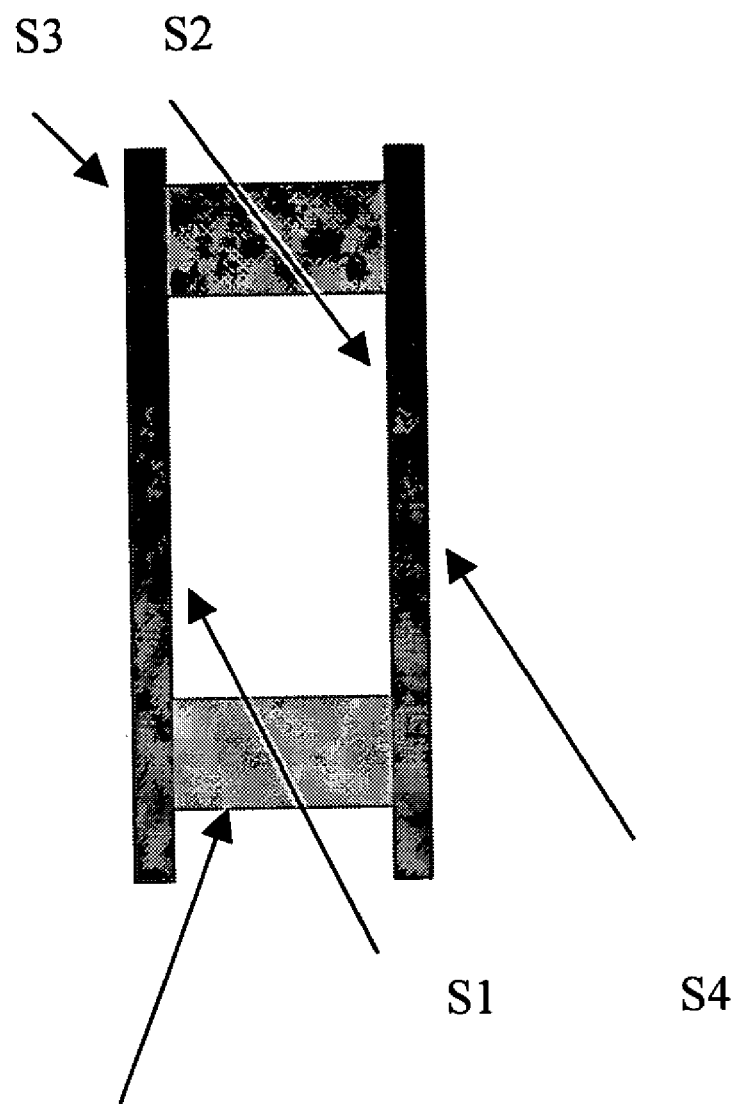
FIG. 10 illustrates a Fabry-Perot etalon structure with parallel inner surfaces coated with antireflective coatings and non-parallel outer surfaces, neither of which is parallel to either inner surface, coated with partial reflective coatings in order to provide a proper Finess and avoid residual reflections from the outer surfaces.
Figure 11:
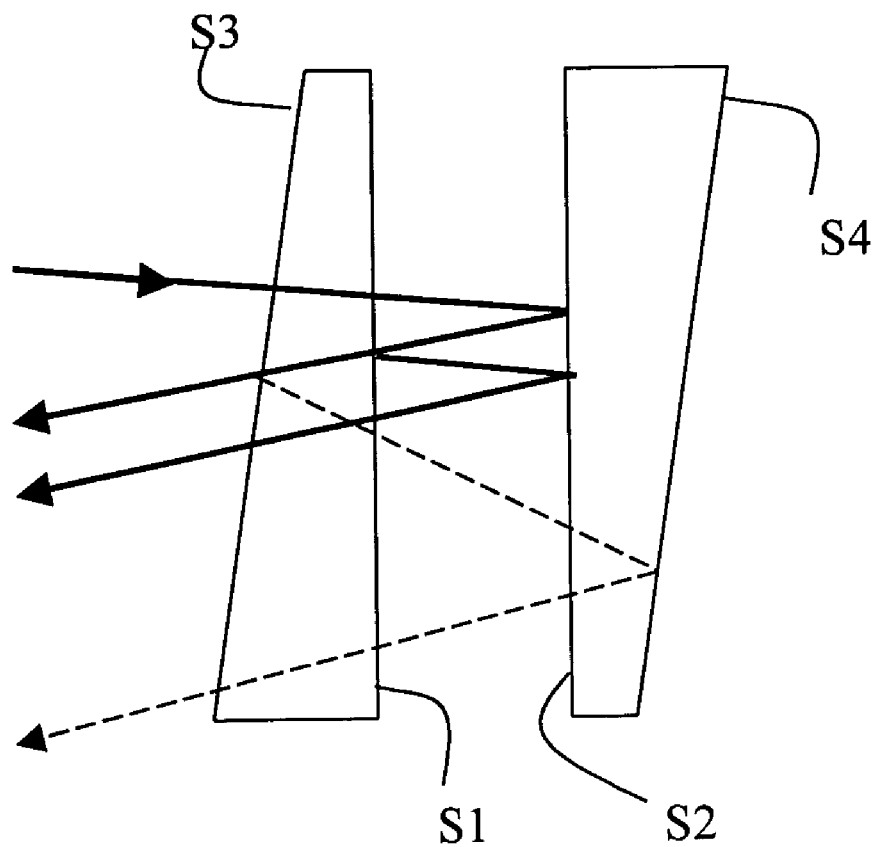
FIG. 11 is an exaggerated view of an etalon with parallel outer surfaces to illustrate the ghost reflections produced thereby even when the outer surfaces are not parallel to the etalon's inner surfaces.

FIG. 10 illustrates a further improvement in the etalon of the invention. The structure of the etalon consists of two pieces of optically transparent material and a pair of spacers, as in conventional etalons. Such a structure includes four optical surfaces, S1, S2, S3 and S4. The two outer surfaces S3 and S4 are coated with anti-reflective (AR) coating. The two inner surfaces S1 and S2 are normally parallel to each other and coated with a partial-reflective (PR) coating. In order to avoid ghost reflections produced by the outer surface S3 and S4, these two surfaces are not made parallel to S1 and S2. However, some secondary reflection from both S3 and S4 will still be parallel to the reflected beam from S1 and S2, as shown in FIG. 11, thereby causing interference with the output beam. Therefore, according to a further improvement of the invention, the surfaces S3 and S4 should also not be parallel to one another.

Figure 12:
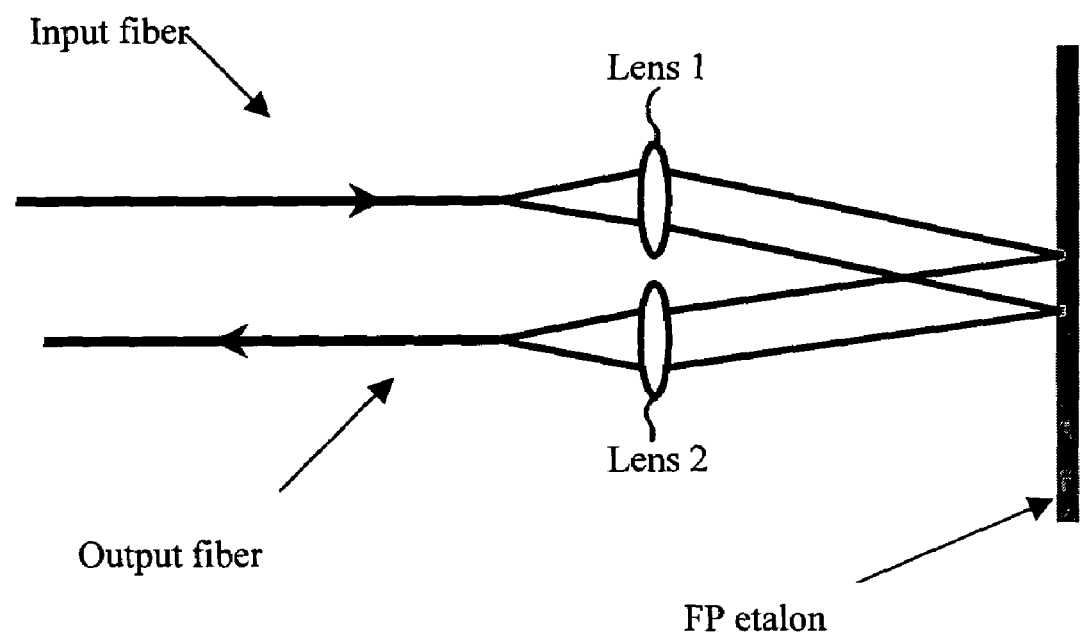
FIG. 12 illustrates the use of lenses in the optical train of the invention.
Figure 13:
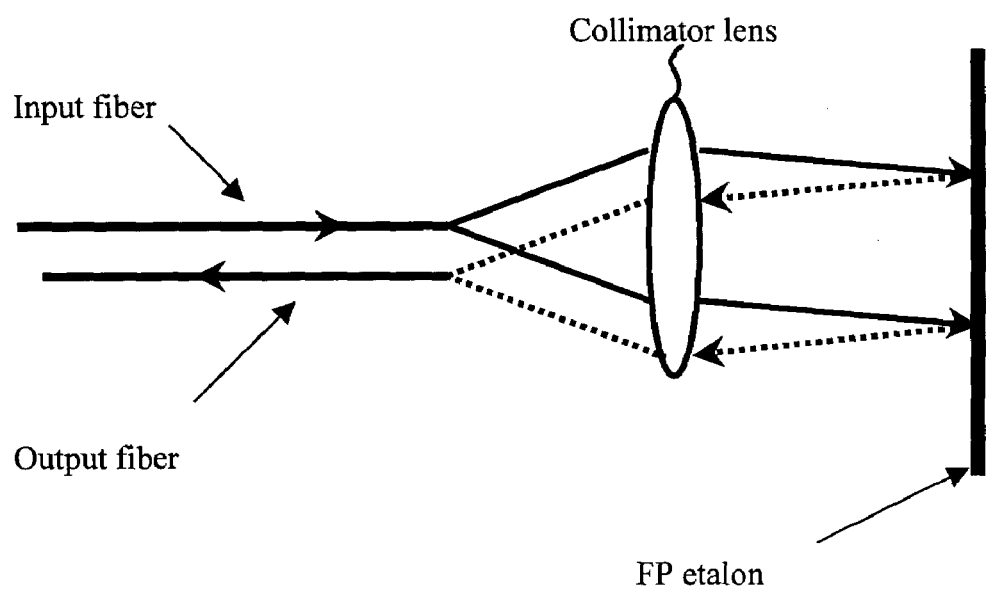
FIG. 13 illustrates the use of a single collimator lens in the optical train of the invention.

FIG. 12 illustrates another potential problem with the conventional use of etalons. The light from the input fiber is collimated through Lens 1 and reflected from a Fabry-Perot etalon. The reflected light is focused by Lens 2 and coupled into the output fiber. Because of the use of the two separate lenses, the assembly and stability could suffer. Therefore, according to a further improvement of the invention illustrated in FIG. 13, a single collimator lens is used, such that the input fiber and the output fiber share the same lens. This makes the device compact and stable. By virtue of this dual-fiber collimator approach, the optical path length of the cavity is fixed for a given collimator because the incident angle of the beam to the etalon is determined by the focal length and the separation of the two fibers. For instance, if a pair of fibers separated by 125 microns is coupled to a collimator lens with a focal length of 5 mm, both the incident and exit angles to the etalon are 0.0125 radians. The effective cavity length is equal to the physical distance multiplied by cos(0.0125).

In essence, the invention lies in the recognition that the spectral properties of the output beams of an optical cavity can be used to enhance the bandwidth of a system. The main idea is to provide a device that produce an output with a spectrum opposite in curvature to that of the spectrum produced by the system, so that the two can cancel out and yield a flattened spectrum within a wide pass band. In DWDM systems, the spectrum is periodic. Therefore, the device needs to be periodic as well. Fabry-Perot cavities, whether symmetrical (i.e., R1=R2) or not, produce such a periodic spectrum in both their reflection and transmission outputs. Therefore, either the reflection or the transmission channels can be used to practice the invention. The curvature of the spectrum at the pass band of each channel produced by the cavity is determined by the period and the reflectivities R1,R2 and can be so adjusted to meet the needs of a particular application.

Figure 9:
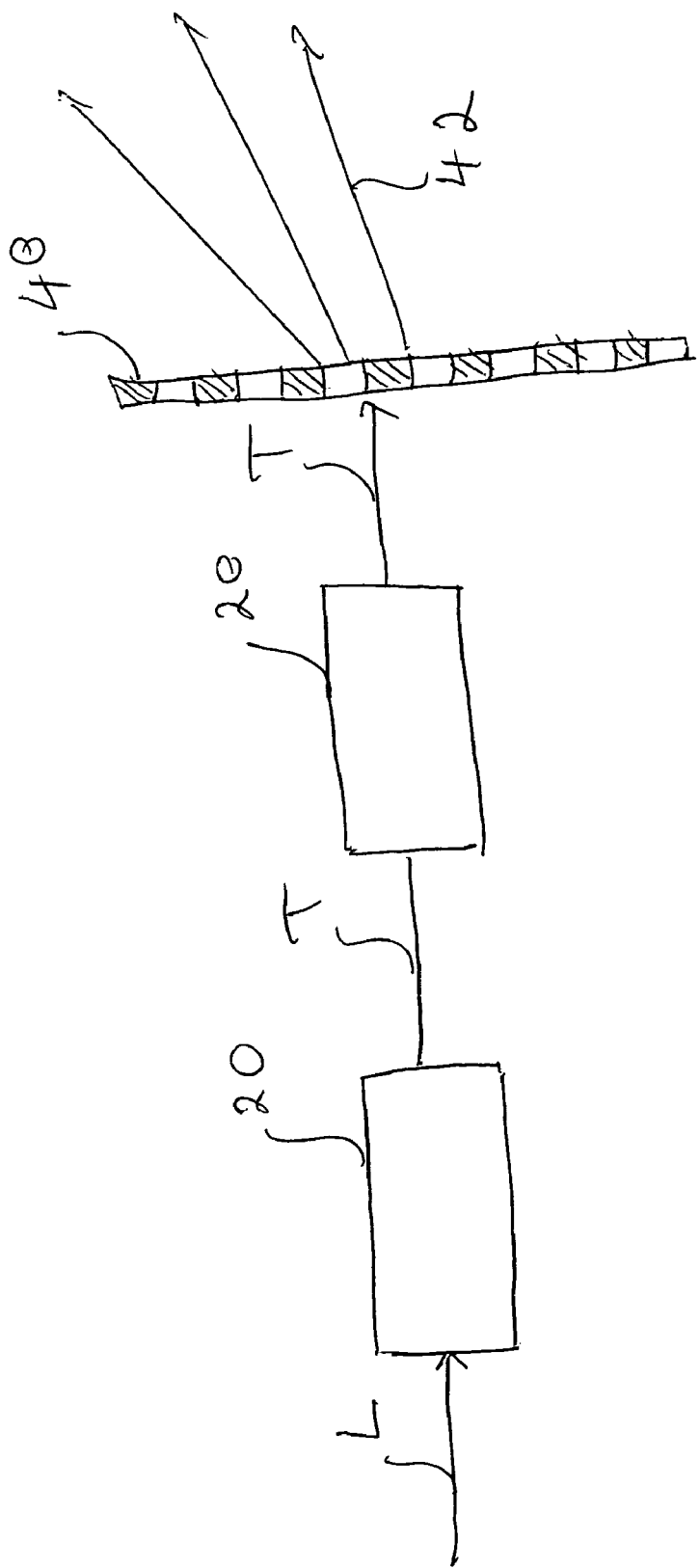
FIG. 9 is a schematic representation of the invention wherein a conventional grating de-MUX device is combined with two optical cavities in series according to the invention.

It is noted that the free-spectral range of the cavity of the invention does not need to be the same as that of the system with which it is combined. So long as the system's FSR is a multiple of the FSR of the cavity (or, vice versa, so long as the FSR of the cavity is an integer fraction of that of the system), as in the case of FIGS. 1 and 7, a degree of compensation can be achieved. In addition, since the linear superposition of periodic functions remains periodic with the same period, more than one cavity can be used in the device of the invention, as illustrated in FIG. 9. The use of multiple cavities enables greater fine tuning of the spectrum curvature of the device in order to match a particular shape. Since each cavity provides at least four tunable parameters (R1, R2, period and location of center frequency of the spectrum channels), additional cavities provide additional flexibility to shape the final output of the device. For example, using two cavities with the same R1,R2 values, their spectra can be offset by different amounts from the center frequency of the target pass band, thereby making it possible to shape it as desired.

Thus, while the invention has been shown and described in what is believed to be the most practical and preferred embodiments, it is recognized that appropriate deviations can be made within the scope of the disclosure. Therefore, the invention is not to be limited to the disclosed details, but is intended to embrace all equivalent structures and methods.

The invention claimed is:

1. A system for increasing the bandwidth of an optical device characterized by a pass band with a predetermined center frequency, comprising:
    an optical cavity having an optical path length that produces an output channel with a free-spectral range and an insertion loss that is maximum in magnitude at a frequency substantially within said pass band; and
    a second optical cavity having an optical path length that produces a second output channel with a free-spectral range with an insertion loss that is maximum in magnitude at a frequency substantially within said pass band of the optical device;
    wherein said output channel of the optical cavity is aligned along an optical path of the optical device; said optical cavity is defined by two plates, each plate has an inner surface and an outer surface, the inner surfaces of the plates are parallel to one another, the outer surfaces of the plates are not parallel to one another, and neither outer surface is parallel to the inner surfaces; and the second optical cavity is combined with the optical device such that said second output channel of the second optical cavity is aligned along said optical path of the optical device.

2. The system of claim 1, wherein said output channel is a transmission channel of the optical cavity.

3. The system of claim 1, wherein said output channel is a reflection channel of the optical cavity.

4. The system of claim 1, wherein said optical cavity includes a means for varying said optical path length of the optical cavity.

5. The system of claim 4, wherein said varying means includes a frequency window.

6. The system of claim 1, wherein said insertion loss is maximum in magnitude at a frequency substantially equal to said center frequency of the pass band.

7. The system of claim 1, further including a lens in said optical path of the optical device, said lens being optically coupled both with an input channel of the optical cavity and with said output channel thereof.

8. An optical multi-channel system comprising:
    an optical multi-channel device characterized by a predetermined free-spectral range and a corresponding pass band and bandwidth in each of a plurality of channels, comprising:
    an optical cavity having an optical path length that produces an output channel with a free-spectral range substantially equal to an integer fraction of said predetermined free-spectral range of the device and with an insertion loss that is maximum in magnitude at a frequency substantially within said pass band of each of the plurality of channels;
    a second optical cavity having an optical path length that produces a second output channel with a free-spectral range substantially equal to an integer fraction of said predetermined free-spectral range of the device and with an insertion loss that is maximum in magnitude at a frequency substantially within said pass band of each of the plurality of channels;
    wherein the optical cavity is combined with the multi-channel device such that said output channel of the optical cavity is aligned along an optical path of the optical multi-channel device; said optical cavity is defined by two plates, each plate has an inner surface and an outer surface, the inner surfaces of the plates are parallel to one another, the outer surfaces of the plates are not parallel to one another, and neither outer surface is parallel to the inner surfaces; and the second optical cavity is combined with the multi-channel device such that said second output channel of the optical cavity is aligned with said optical path of the optical device.

9. The system of claim 8, wherein said output channel is a transmission channel of the optical cavity.

10. The system of claim 9, wherein said varying means includes a frequency window.

11. The system of claim 8, wherein said output channel is a reflection channel of the optical cavity.

12. The system of claim 8, wherein said optical cavity includes a means for varying said optical path length of the optical cavity.

13. The system of claim 8, wherein said insertion loss is maximum in magnitude at a frequency substantially equal to a center frequency of said pass band of each of the plurality of channels.

14. The system of claim 8, wherein said multichannel device is a multiplexer.

15. The system of claim 8, wherein said multichannel device is a de-multiplexer.

16. The system of claim 8, wherein said integer fraction 1s equal to unity.

17. The system of claim 8, further including a lens in said optical path of the optical multi-channel device, said lens being optically coupled both with an input channel of the optical cavity and with said output channel thereof.

* * * * *